(12) United States Patent
Kraft, IV et al.

(10) Patent No.: US 8,438,544 B2
(45) Date of Patent: May 7, 2013

(54) OPEN SYSTEMS DEVELOPER PORTAL AND MANAGING SOFTWARE DEVELOPMENT PROJECTS

(75) Inventors: George Kraft, IV, Austin, TX (US);
Aaron Michael Leventhal, Esslingen am Neckar (DE)

(73) Assignee: International Business Machines Corporation, Armonk, NY (US)

( * ) Notice: Subject to any disclaimer, the term of this patent is extended or adjusted under 35 U.S.C. 154(b) by 993 days.

(21) Appl. No.: 12/486,975

(22) Filed: Jun. 18, 2009

(65) Prior Publication Data
US 2010/0325602 A1 Dec. 23, 2010

(51) Int. Cl.
*G06F 9/44* (2006.01)
*G06F 9/45* (2006.01)

(52) U.S. Cl.
USPC ............................ 717/124; 717/103; 717/121

(58) Field of Classification Search .......... 717/103–108, 717/114–116, 121–129
See application file for complete search history.

(56) References Cited

U.S. PATENT DOCUMENTS

| | | | | |
|---|---|---|---|---|
| 5,339,435 A | * | 8/1994 | Lubkin et al. | 717/121 |
| 6,253,368 B1 | * | 6/2001 | Nelin et al. | 717/124 |
| 6,715,139 B1 | * | 3/2004 | Kodosky et al. | 717/125 |
| 6,721,941 B1 | * | 4/2004 | Morshed et al. | 717/127 |
| 6,795,962 B1 | * | 9/2004 | Hanson | 717/129 |
| 6,957,366 B1 | * | 10/2005 | McDonald | 714/38.14 |
| 6,988,025 B2 | * | 1/2006 | Ransom et al. | 700/295 |
| 7,454,462 B2 | * | 11/2008 | Belfiore et al. | 709/203 |
| 7,516,438 B1 | * | 4/2009 | Leonard et al. | 717/102 |
| 7,555,744 B2 | * | 6/2009 | Chkodrov et al. | 717/124 |
| 7,631,006 B2 | * | 12/2009 | Hagstrom et al. | 1/1 |
| 7,657,872 B2 | * | 2/2010 | Kelbaugh et al. | 717/124 |
| 7,743,360 B2 | * | 6/2010 | Venolia | 717/103 |
| 7,873,940 B2 | * | 1/2011 | Sanghvi et al. | 717/102 |
| 7,886,352 B2 | * | 2/2011 | Pandrangi et al. | 726/12 |
| 7,900,201 B1 | * | 3/2011 | Qureshi et al. | 717/174 |
| 7,904,875 B2 | * | 3/2011 | Hegyi | 717/103 |
| 7,921,112 B2 | * | 4/2011 | Bush et al. | 707/737 |
| 7,971,187 B2 | * | 6/2011 | Sanghvi et al. | 717/121 |
| 7,971,194 B1 | * | 6/2011 | Gilboa | 717/136 |
| 8,069,435 B1 | * | 11/2011 | Lai | 717/106 |
| 8,087,002 B2 | * | 12/2011 | Fjeldstad et al. | 717/124 |
| 8,201,150 B2 | * | 6/2012 | Ghiloni et al. | 717/125 |
| 8,261,242 B2 | * | 9/2012 | Booth et al. | 717/128 |
| 2006/0195539 A1 | | 8/2006 | Nichols et al. | |

OTHER PUBLICATIONS

Simmons, "Measuring and tracking distributed software development projects", IEEE FTDCS, pp. 1-7, 2003.*
Grimstad et al, "A framework for the analysis of software cost estimation accuracy", ACM ISESE, pp. 58-65, 2006.*
Palix et al, "Tracking code patterns over multiple software versions with herodotos", ACM AOSD, pp. 169-180, 2010.*
Concas et al, "An emprical study of a social networks metrics in object oriented software", ACM, article ID 729826, pp. 1-21, 2010.*

* cited by examiner

*Primary Examiner* — Anil Khatri
(74) *Attorney, Agent, or Firm* — Yee & Associates, P.C.; Yeen Tham (57) ABSTRACT

A plurality of development projects is managed by a network portal that receives a first request to be accessed using a single user account. The network portal allows a user, using the single user account, to access any corresponding members of a set of elements and any corresponding development projects. A second request is received to access a first element within the set of elements via the network portal and using a namespace.

17 Claims, 4 Drawing Sheets

OPEN SYSTEMS DEVELOPER PORTAL AND MANAGING SOFTWARE DEVELOPMENT PROJECTS

BACKGROUND

1. Field

The present invention relates generally to an improved method computer program product and data processing system for developing software applications and more specifically to an open source developer portal.

2. Description of the Related Art

Software developers collaborate on various software development projects scattered around the globe. Many software development projects use the same software engineering techniques and tools for source code management, and for the tracking of bugs and features of software. Unfortunately, these autonomous projects often use different service providers. As a result, many software developers must maintain many different accounts to many different services. Some developers must maintain multiple accounts within the same service.

Maintaining multiple development accounts is cumbersome to the software developer, because the software developer has to keep track of account names, passwords, individual bugs or features being tracked, different naming conventions, and other issues associated with maintaining multiple accounts among multiple services. As a result, the efficiency of a software development project can be decreased.

SUMMARY

The illustrative embodiments described herein provide a computer-implemented method, apparatus, and computer usable program code for managing a development project. A network portal receives a first request to be accessed using a single user account. The network portal defines a namespace. The namespace comprises a system for specifying a set of elements associated with the plurality of development projects. Corresponding members of the set of elements are associated with corresponding development projects within the plurality of development projects. The network portal allows a user, using the single user account, to access any of the corresponding members of the set of elements and any of the corresponding development projects. A second request is received to access a first element within the set of elements via the network portal and using the namespace. The first element is retrieved.

BRIEF DESCRIPTION OF THE SEVERAL VIEWS OF THE DRAWINGS

The novel features believed characteristic of the illustrative embodiments are set forth in the appended claims. The illustrative embodiments, themselves, as well as a preferred mode of use, further objectives, and advantages thereof, will best be understood by reference to the following detailed description of an illustrative embodiment when read in conjunction with the accompanying drawings, wherein:

DETAILED DESCRIPTION

Figure 1:
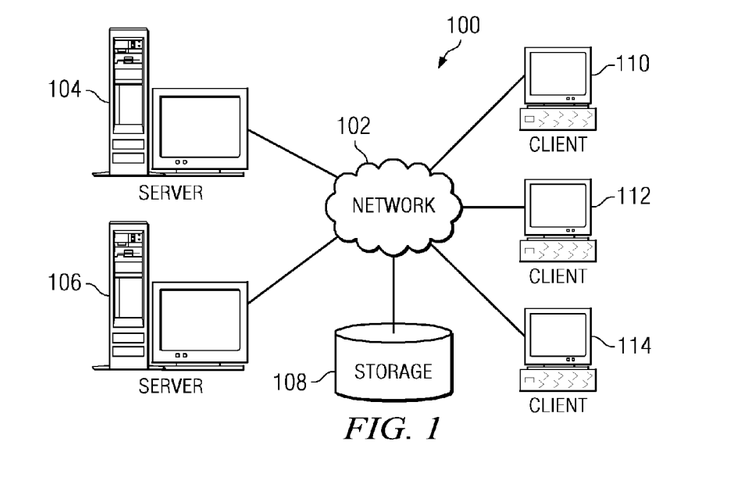
FIG. 1 is a block diagram of a network of data processing systems, in which aspects of the present invention may be implemented.
Figure 2:
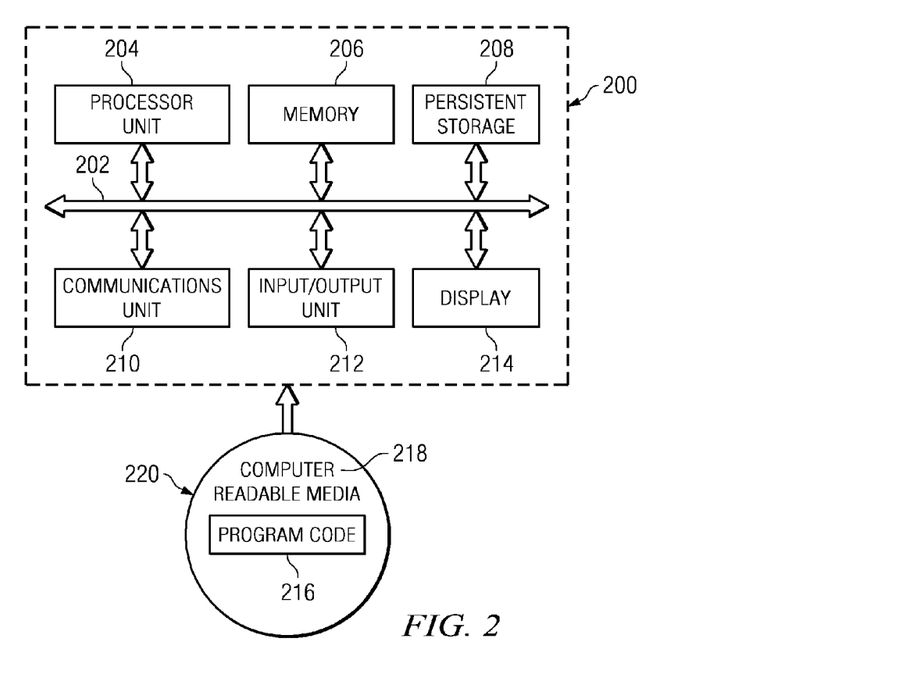
FIG. 2 is a block diagram of a data processing system, in which aspects of the present invention may be implemented.

With reference now to the figures, and in particular with reference to FIGS. 1-2, exemplary diagrams of data processing environments are provided in which illustrative embodiments may be implemented. It should be appreciated that FIGS. 1-2 are only exemplary and are not intended to assert or imply any limitation with regard to the environments in which different embodiments may be implemented. Many modifications to the depicted environments may be made.

FIG. 1 is a block diagram of a network of data processing systems, in which aspects of the present invention may be implemented. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

FIG. 2 is a block diagram of a data processing system, in which aspects of the present invention may be implemented. Data processing system 200 is an example of a computer, such as server 104 or client 110 in FIG. 1, in which computer usable program code or instructions implementing the processes may be located for the illustrative embodiments. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems in which a main processor is present with secondary processors on a single chip. As another illustrative example, processor unit 204 may be a symmetric multi-processor system containing multiple processors of the same type.

Memory 206, in these examples, may be, for example, a random access memory or any other suitable volatile or non-volatile storage device. Persistent storage 208 may take various forms depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard and mouse. Further, input/output unit 212 may send output to a printer. Display 214 provides a mechanism to display information to a user.

Instructions for the operating system and applications or programs are located on persistent storage 208. These instructions may be loaded into memory 206 for execution by processor unit 204. The processes of the different embodiments may be performed by processor unit 204 using computer implemented instructions, which may be located in a memory, such as memory 206. These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 216 is located in a functional form on computer readable media 218 that is selectively removable and may be loaded onto or transferred to data processing system 200 for execution by processor unit 204. Program code 216 and computer readable media 218 form computer program product 220 in these examples. In one example, computer readable media 218 may be in a tangible form, such as, for example, an optical or magnetic disc that is inserted or placed into a drive or other device that is part of persistent storage 208 for transfer onto a storage device, such as a hard drive that is part of persistent storage 208. In a tangible form, computer readable media 218 also may take the form of a persistent storage, such as a hard drive, a thumb drive, or a flash memory that is connected to data processing system 200. The tangible form of computer readable media 218 is also referred to as computer recordable storage media. In some instances, computer recordable media 218 may not be removable.

Alternatively, program code 216 may be transferred to data processing system 200 from computer readable media 218 through a communications link to communications unit 210 and/or through a connection to input/output unit 212. The communications link and/or the connection may be physical or wireless in the illustrative examples. The computer readable media also may take the form of non-tangible media, such as communications links or wireless transmissions containing the program code.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown.

As one example, a storage device in data processing system 200 is any hardware apparatus that may store data. Memory 206, persistent storage 208, and computer readable media 218 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The illustrative embodiments described herein provide a computer-implemented method, apparatus, and computer usable program code for managing a development project. A network portal receives a first request to be accessed using a single user account. The network portal defines a namespace. The namespace comprises a system for specifying a set of elements associated with the plurality of development projects. Corresponding members of the set of elements are associated with corresponding development projects within the plurality of development projects. The network portal allows a user, using the single user account, to access any of the corresponding members of the set of elements and any of the corresponding development projects. A second request is received to access a first element within the set of elements via the network portal and using the namespace. The first element is retrieved. The term "retrieved" is defined as downloading, moving, modifying, displaying, printing, storing, or combinations thereof.

Figure 3:
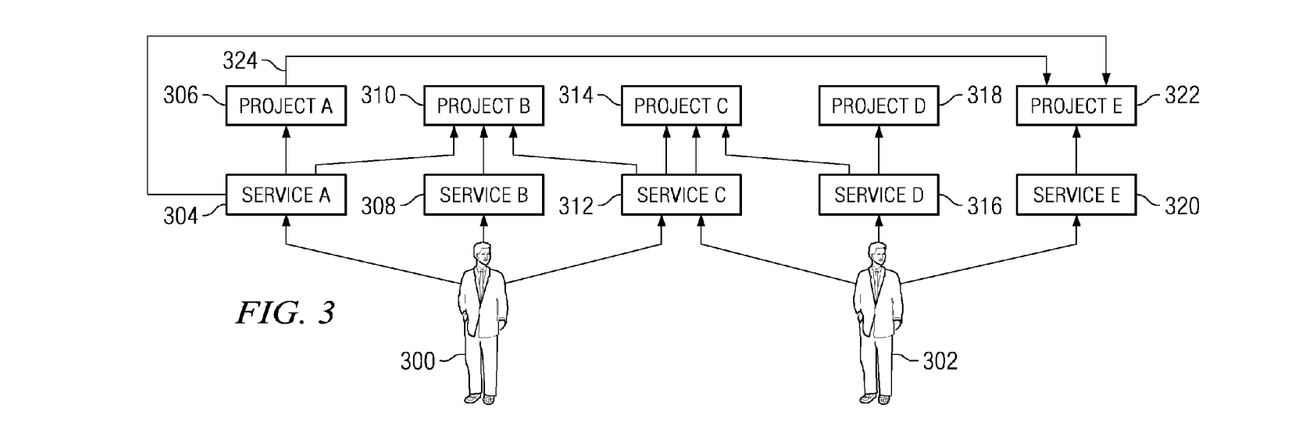
FIG. 3 is a block diagram of a prior art system for developing software projects, in which the illustrative embodiments of the present invention may be implemented.

FIG. 3 is a block diagram of a prior art system for developing software projects, in which the illustrative embodiments of the present invention may be implemented. The block diagram shown in FIG. 3 can be implemented using one or more data processing systems such as server 104 or server 106 or client 110, client 112, or client 114 shown in FIG. 1, or data processing system 200 shown in FIG. 2. The project development described with respect to FIG. 3 can be implemented over a network such as network 102 shown in FIG. 1.

In the software development process shown in FIG. 3, user 300 and user 302 each use multiple services to access multiple projects. Each project corresponds to a portion of an overall project. A portion of an overall project can be the development of a section of code, an object, a module, a solution to a bug, or any other sub-project identified with respect to an overall software development project.

In particular, user 300 uses service A 304 to keep track of project A 306. Similarly, user 300 uses service B 308 to track project B 310 and service C 312 to track project C 314. User 302 also uses service C 312 to track project C 314. In addition, user 302 uses service D 316 to track project D 318. Likewise, user 302 uses service E 320 to track project E 322. As shown by line 324, project A 306 is related to project E 322. In this illustrative example, project E 322 depends on project A 306.

Service A 304, service B 308, service C 312, service D 316, and service E 320 each represent a different kind of software development service. A software development service is a service used to track various aspects of software development. For example, a service can be a Web service used for tracking software bugs. Examples of these services include Bugzilla, SourceForge, GForge, and Nongnu. Each of these exemplary services can be found on the Internet. For example, Bugzilla can be found at www.bugzilla.org, SourceForge can be found at sourceforge.net, GForge can be found at gforge.org, and Nongnu can be found at www.nongnu.org.

Because user 300 and user 302 must use multiple services, each possibly involving multiple accounts, the overall software project can be difficult to manage. The difficulties in management increase because user 300 and user 302 both access and work on project C 314 via service C 312, but are identified by different user names. Additionally, because project E 322 depends on project A 306, user 302 may not be able to track the status of project A 306 in a desired manner. In this example, only user 300 via service A 304 is tracking and updating project A 306; thus, user 302 does not have access to an important aspect of the development work on project A 306.

Still further, a given service may require multiple accounts with respect to a single user. For example, user 300 has two accounts with service C 312, one to access project C 314 and one to access project B 310. Still more confusingly, user 300 uses service A 304 to access project E 322 whereas user 302 uses service E 320 to access and track project E 322. The resulting complexity in the overall project management can result in confusion and inefficiency in the overall software development project.

Figure 4:
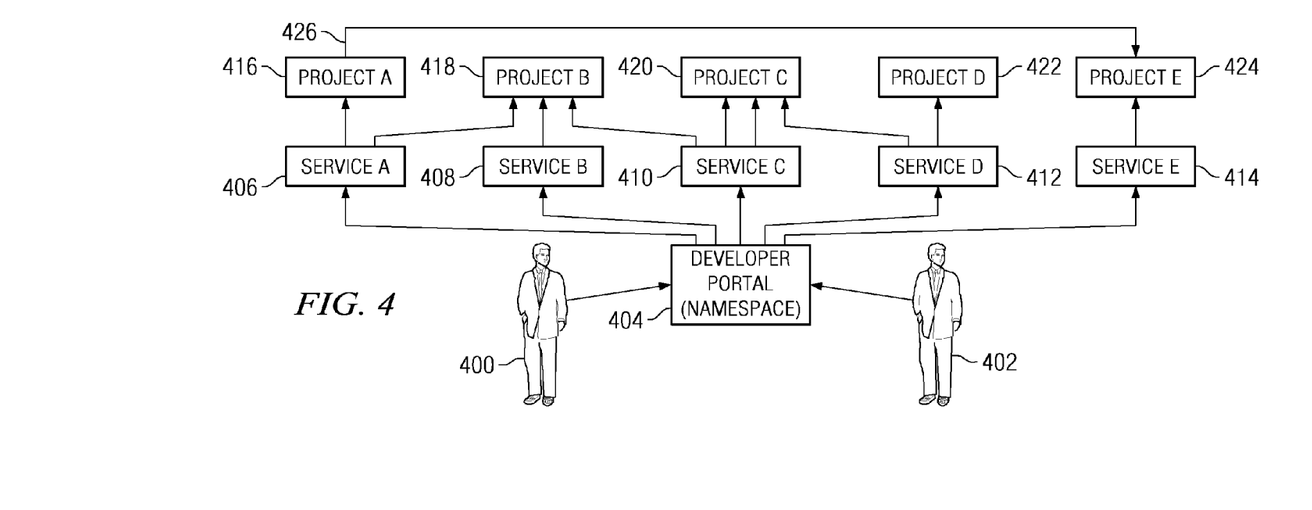
FIG. 4 is a block diagram of a system for developing software projects, in accordance with an illustrative embodiment of the present invention.

FIG. 4 is a block diagram of a system for developing software projects, in accordance with an illustrative embodiment of the present invention. The system of project management shown in FIG. 4 can be implemented using one or more data processing systems such as server 104 or server 106, or client 110, client 112, or client 114 shown in FIG. 1, or data processing system 200 shown in FIG. 2. The project management scheme shown in FIG. 4 seeks to accomplish the same goals as the project management scheme shown in FIG. 3; however, FIG. 4 represents an improved project management scheme. In FIG. 4, user 400 corresponds to user 300 in FIG. 3, and user 402 corresponds to user 302 in FIG. 3. Similarly, the various services and projects shown in FIG. 4 correspond to similar services and projects described in FIG. 3.

The various services, such as service A 406, service B 408, service C, 410, service D 412, and service E 414, are each the same services described with respect to FIG. 3. Similarly, project A 416, project B 418, project C 420, project D 422, and project E 424 correspond to similar projects described with respect to FIG. 3. As shown by the arrows between the respective services and projects in FIG. 4, the relationship between services and projects does not change. Thus, for example, service A 406 is still used to access project A 416 and project B 418. Similarly, as shown by line 426, project E 424 still depends on project A 416. However, unlike the project management scheme shown in FIG. 3, a single developer portal, namely developer portal 404, is used to access the various services and thereby keep track of the various projects. Thus, all of the user's software development accounts are workflowed into a single developer portal 404.

In an illustrative embodiment of the present invention, user 400 and user 402 both access developer portal 404. Developer portal 404 is a computer program executable on a server. The computer program can be characterized as computer usable program code on a recordable type medium. The developer portal defines a namespace for a set of elements of the various development projects, and provides computer usable program code for accessing a set of services usable in the course of the overall development project. Thus, user 400 and user 402 maintain only one account apiece with respect to developer portal 404. In turn, developer portal 404 uses the namespace to identify various aspects or elements of the various projects, as accessed by various different services.

Developer portal 404 can be implemented using modern Internet protocols, such as the secure shell (SSH) and really simple syndication (RSS). The other aspect of developer portal 404 that allows for automated tracking of elements within various projects through various services is a defined namespace. An element can be a software bug, a software feature such as, for example, a graphical user interface or some functionality to implement a software program, a particular set of computer usable program code, a notation regarding software, a status report on a second development project, a flag, combinations thereof, or other elements of interests in a software development project.

A namespace is a system for specifying projects, products, components, bug numbers, element identification, and other items relevant to project development in the universal manner. In this way, in an illustrative example, a software bug database installation could involve using the software bug namespace. A software bug management portal could collect information of interest to a given user regarding a particular bug, regardless of which service or services are used to track that software bug. Developer portal 404 tracks which service is used to track the particular software bug of interest.

For example, the namespace syntax could be a string of alphanumeric characters, followed by a colon, followed by a second string of alphanumeric characters. In an illustrative embodiment of the present invention, the first string of alphanumeric characters designates a name of the service being used to track a bug. The second string of alphanumeric characters could be used to identify uniquely the particular software bug. For example, bgz:34521 could represent software bug number 34521 being tracked via the Bugzilla service. Thus, using this particular namespace format, the first string of alphanumeric characters identifies the service being used to track the software bug, the colon indicates the separation between the first and second strings of alphanumeric characters, and the second string of alphanumeric characters uniquely identifies the software bug of interest.

A server that executes the developer portal 404 could be used to store the various names of different elements. Thus, developer portal 404 can readily access the appropriate services being used to track particular elements.

The namespace in developer portal 404 can also be used to designate dependencies. For example a second colon can be added after the second string of alphanumeric characters and a third string of alphanumeric characters can be added the second colon. The third string of alphanumeric characters may designate another bug or another project on which the first bug or service depends. Additionally, more colons and strings of alphanumeric characters can be used to mark duplicates; for example, that a particular bug is a duplicate of another bug mentioned in another project, to flag a bug or element, or to designate that a particular bug or element depends on another bug or element.

In an illustrative embodiment of the present invention, developer portal 404 can also add a universal resource link (URL) to a particular name of the bug or element, in order to provide an instant link to information regarding that bug or element. In another illustrative embodiment of the present invention, developer portal 404 could use names within the namespace to search for bugs or other elements across multiple services. Thus, not only do the illustrative embodiments of the present invention provide for simpler access to services, but they also represent a more powerful mechanism for software project management relative to prior art methods of software project management.

Figure 5:
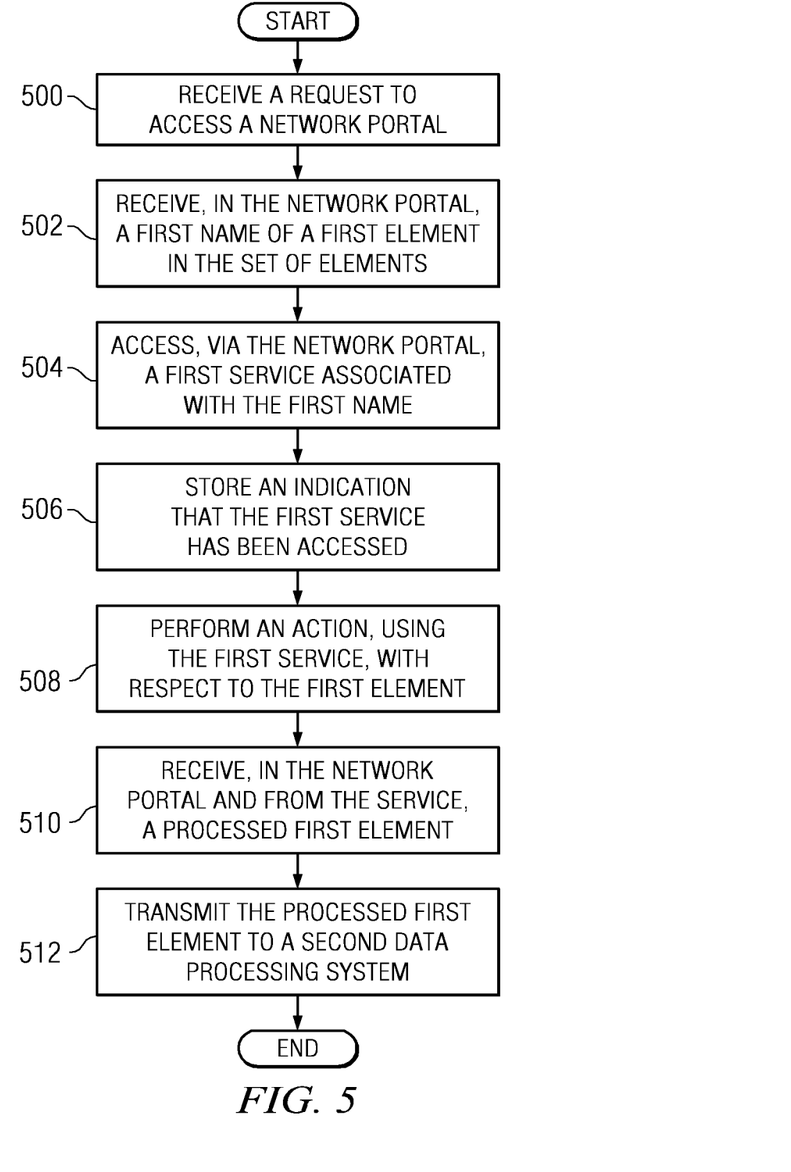
FIG. 5 is a flowchart of a process for managing a development project, in accordance with an illustrative embodiment of the present invention.

FIG. 5 is a flowchart of a process for managing a development project, in accordance with an illustrative embodiment of the present invention. The process shown in FIG. 5 can be implemented using one or more data processing systems such as server 104 or server 106, or client 110, client 112, or client 114 shown in FIG. 1, or data processing system 200 shown in FIG. 2. The process shown in FIG. 5 can be implemented in a developer portal, such as developer portal 404 shown in FIG. 4.

The process begins as a request is received to access the network portal (process block 500). The network portal comprises first computer usable program code for defining a namespace for a set of elements of the development project and second computer usable program code for accessing a set of services usable in the course of the development project. An element can be any aspect of software development such as, for example, a software bug, a software feature, a computer usable program code, a notation regarding software, a status report on a second development project, a flag, and combinations thereof. A service can be any service used to assist in the development of software or other projects. In an illustrative example of the present invention, the namespace is usable to identify which service in a set of services each element in the set of elements is associated. In an illustrative example of the present invention, the namespace comprises a system of abbreviation comprising a first alphanumeric string indicating a name, a colon, and a second alphanumeric string appearing after the colon, wherein the second alphanumeric string indicates a unique identification associated with the name. For example, a first name within the namespace can comprise BUG:1234.

Next, the development portal receives a first name of a first element in a set of elements (process block 502). The first name is within the namespace. Then, the network portal accesses a first service associated with the first name (process block 504). The first service is in the set of services, and the first name is in the set of names.

Then, the development portal stores an indication that the first service has been accessed (process block 506). An indication can be, for example, a message that a user has logged on to a service. An indication that the service has been accessed could also be a message indicating that an element has been successfully created, modified, or deleted with respect to a particular project with which the service is being used.

The development portal then performs an action using the first service with respect to the first element (process block 508). In an illustrative example, the action comprises at least one of naming the software bug, tracking the software bug, specifying the dependency of the software bug on a second software bug, specifying the dependency of the software bug on an implementation of a software feature, specifying the dependency of the software feature on a second software feature, specifying a uniform resource link (URL) usable to access information about the software bug, mark a duplicate bug, flag a bug, specify that a software feature has been completed, specify the status of the software feature, specify that a software feature has been delayed, specify that a software feature has been canceled, specify a source of a software feature, and combinations thereof.

Next, the network portal receives from the service a processed first element (process block 510). A processed first element can be, for example an indication that a formerly identified software bug has been updated, that a fix for the software bug has been developed in another software project, that the software bug has been identified in another software project, or any other indication that an element has been processed, modified, deleted, or added.

The network portal then transmits the processed first element to a second data processing system (process block 512). In an illustrative example of the present invention, the second data processing system is distinct from and different than the first data processing system that is used to implement or execute the network portal.

Figure 6:
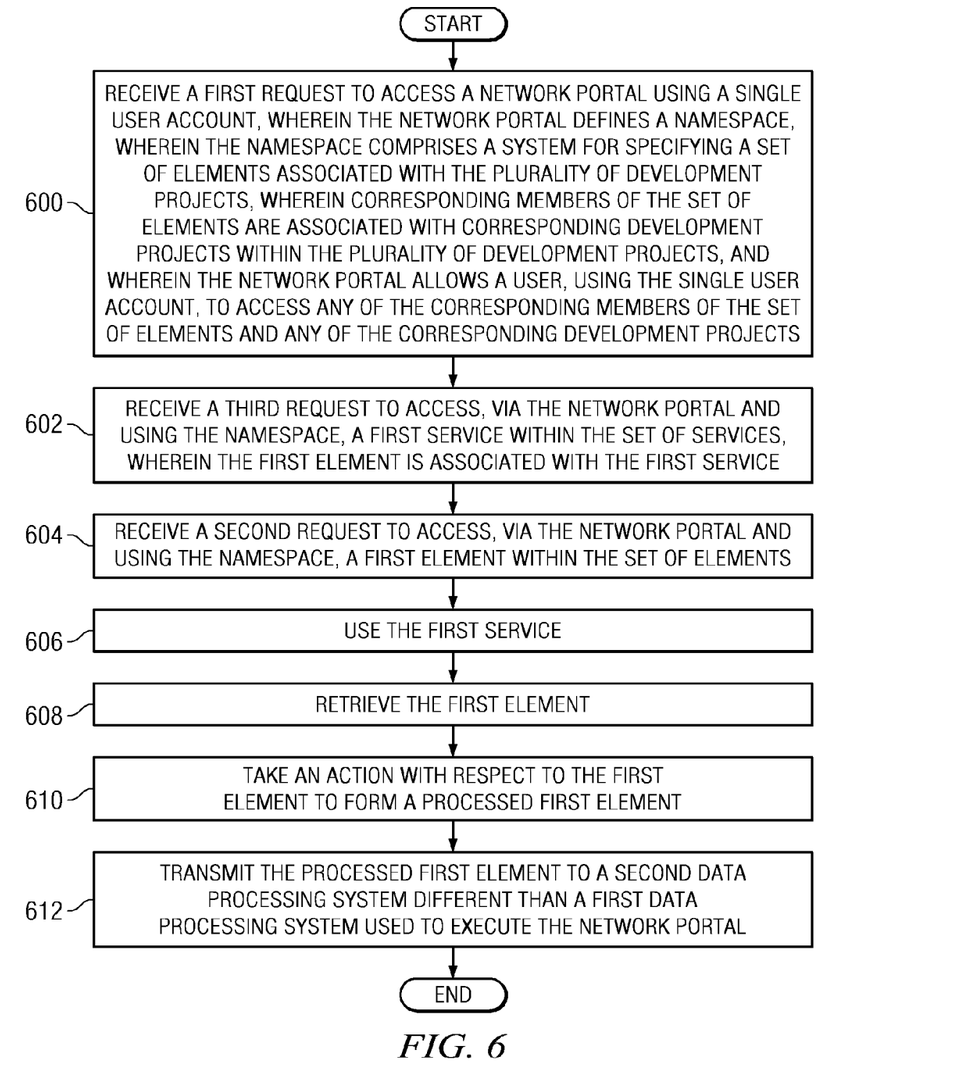
FIG. 6 is a flowchart of a process for managing a development project, in accordance with an illustrative embodiment of the present invention.

FIG. 6 is a flowchart of a process for managing a development project, in accordance with an illustrative embodiment of the present invention. The process shown in FIG. 6 can be implemented using one or more data processing systems such as server 104 or server 106, or client 110, client 112, or client 114 shown in FIG. 1, or data processing system 200 shown in FIG. 2. The process shown in FIG. 6 can be implemented in a developer portal, such as developer portal 404 shown in FIG. 4.

The process begins as a network portal first receives a request to be accessed using a single user account, wherein the network portal defines a namespace, wherein the namespace comprises a system for specifying a set of elements associated with the plurality of development projects, wherein corresponding members of the set of elements are associated with corresponding development projects within the plurality of development projects, and wherein the network portal allows a user, using the single user account, to access any of the corresponding members of the set of elements and any of the corresponding development projects (step 600). The set of elements can be at least one of a software bug, a software feature, a computer usable program code, a notation regarding software, a status report on a second development project, a flag, and combinations thereof.

Next, the network portal receives a third request, using the namespace, to access a first service within a set of services, wherein the namespace further comprises a system for specifying the set of services, wherein the set of services are associated with the plurality of development projects, and wherein the first element is associated with the first service (step 602). Corresponding members of the set of elements are further associated with the corresponding members of the set of services. The first service can comprise at least one service used to track an aspect of software development. The first service can be a Web service used to track software bugs.

Then, the network portal receives a second request, using the namespace, to access a first element within the set of elements (step 604). The first service (step 606) retrieves the first element (step 608).

Afterwards, an action is taken with respect to the first element to form a processed first element (step 610). The action can be at least one of naming a software bug, tracking the software bug, specifying a dependency of the software bug on a second software bug, specifying a dependency of the software bug on implementation of a software feature, specifying a dependency of the software feature on a second software feature, specifying a uniform resource link usable to access information about the software bug, mark a duplicate bug, flag a bug, specify that a software feature has been completed, specify a status of a software feature, specify that a software feature has been delayed, specify that a software feature has been canceled, specifying a source of a software feature, and combinations thereof.

If desired, the processed first element may be transmitted to a second data processing system different than a first data processing system used to execute the network portal (step 612). The process terminates thereafter.

Thus, the illustrative embodiments described herein provide a computer-implemented method, apparatus, and computer usable program code for managing a development project. A network portal receives a request to be accessed using a single user account. The network portal defines a namespace. The namespace comprises a system for specifying a set of elements associated with the plurality of development projects. Corresponding members of the set of elements are associated with corresponding development projects within the plurality of development projects. The network portal allows a user, using the single user account, to access any of the corresponding members of the set of elements and any of the corresponding development projects. A network portal receives a first name of a first element within the set of elements, wherein the first name is within the namespace. The first element is retrieved.

In another illustrative embodiment, the namespace further comprises a system for specifying a set of services associated with the plurality of development projects. Corresponding members of the set of services are associated with the corresponding development projects. Corresponding members of the set of elements are further associated with the corresponding members of the set of services. The network portal allows the user, using the single user account, to access any of the members of the corresponding set of services.

In another illustrative embodiment, the method further includes receiving a request to access, via the network portal and using the namespace, a first service within the set of services, wherein the first element is associated with the first service. This method further includes using the first service.

In another illustrative embodiment, the set of services comprise at least one service used to track an aspect of software development. In this case, the set of services can be a Web service used to track software bugs.

In yet another illustrative embodiment, the set of elements comprises at least one of a software bug, a software feature, a computer usable program code, a notation regarding software, a status report on a second development project, a flag, and combinations thereof.

In still another illustrative embodiment, the method includes taking an action with respect to the first element. The action comprises at least one of naming a software bug, tracking the software bug, specifying a dependency of the software bug on a second software bug, specifying a dependency of the software bug on implementation of a software feature, specifying a dependency of the software feature on a second software feature, specifying a uniform resource link usable to access information about the software bug, mark a duplicate bug, flag a bug, specify that a software feature has been completed, specify a status of a software feature, specify that a software feature has been delayed, specify that a software feature has been canceled, specifying a source of a software feature, and combinations thereof.

In a further illustrative embodiment, after taking an action, a processed first element is formed. In this case, the method includes transmitting the processed first element to a second data processing system different than a first data processing system used to execute the network portal.

In another illustrative embodiment, the namespace further comprises a system of abbreviation comprising a first alphanumeric string indicating a name, a colon, and a second alphanumeric string appearing after the colon, wherein the second alphanumeric string indicates a unique identification associated with the name. For example, a first name within the namespace can be BUG:1234.

Embodiments of the present invention may be implemented entirely in hardware, entirely in software or using a combination of both hardware and software elements. In one embodiment, the invention is implemented in software, including but not being limited to firmware, resident software, microcode, or the like.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a communication medium (e.g., a system bus). The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention embodiments in the form disclosed. Many modifications and variations will be apparent to those of ordinary skill in the art. The embodiment was chosen and described in order to explain the principles of the invention, the practical application, and to enable others of ordinary skill in the art to understand the invention for various embodiments with various modifications as are suited to the particular use contemplated.

What is claimed is:

1. A computer-implemented method for managing a plurality of development projects, the computer-implemented method comprising:

a computer receiving a first request to access a network portal using a single user account, wherein the network portal is executed by a first data processing system, wherein the network portal defines a namespace, wherein the namespace comprises a system for specifying a set of elements associated with the plurality of development projects, wherein corresponding members of the set of elements are associated with corresponding development projects within the plurality of development projects, and wherein the network portal allows a user, using the single user account, to access any of the corresponding members of the set of elements and any of the corresponding development projects;

the computer receiving a second request to access, via the network portal and using the namespace, a first element within the set of elements;

the computer retrieving the first element;

the computer taking an action with respect to the first element, wherein the action comprises at least one of naming a software bug, tracking the software bug, specifying a dependency of the software bug on a second software bug, specifying a dependency of the software bug on implementation of a software feature, specifying a dependency of the software feature on a second software feature, specifying a uniform resource link usable to access information about the software bug, mark a duplicate bug, flag a bug, specify that a software feature has been completed, specify a status of a software feature, specify that a software feature has been delayed, specify that a software feature has been canceled, specifying a source of a software feature, and combinations thereof; and the computer transmitting the first element to a second data processing system different than the first data processing system used to execute the network portal.

2. The computer-implemented method of claim 1, wherein the namespace further comprises a system for specifying a set of services associated with the plurality of development projects, wherein corresponding members of the set of services are associated with the corresponding development projects, wherein corresponding members of the set of elements are further associated with the corresponding members of the set of services, and wherein the network portal allows the user, using the single user account, to access any of the members of the corresponding set of services.

3. The computer-implemented method of claim 2, further comprising:

the computer receiving a third request to access, via the network portal and using the namespace, a first service within the set of services, wherein the first element is associated with the first service; and the computer using the first service.

4. The computer-implemented method of claim 2, wherein the set of services comprise at least one service used to track an aspect of software development.

5. The computer-implemented method of claim 4, wherein the set of services comprises a Web service used to track software bugs.

6. The computer-implemented method of claim 1, wherein the set of elements comprises at least one of a software bug, a software feature, a computer usable program code, a notation regarding software, a status report on a second development project, a flag, and combinations thereof.

7. The computer-implemented method of claim 1, wherein, after taking an action, a processed first element is formed, and wherein the computer implemented method further comprises:

the computer transmitting the processed first element to a second data processing system different than a first data processing system used to execute the network portal.

8. The computer-implemented method of claim 1 wherein the namespace further comprises a system of abbreviation comprising a first alphanumeric string indicating a name, a colon, and a second alphanumeric string appearing after the colon, wherein the second alphanumeric string indicates a unique identification associated with the name.

9. The computer-implemented method of claim 8, wherein a first name within the namespace comprises BUG:1234.

10. A computer program product for managing a plurality of development projects stored on a recordable-type storage medium, the computer program product comprising:

computer usable program code stored on the recordable-type storage medium for receiving a request to access a network portal using a single user account, wherein the network portal defines a namespace, wherein the namespace comprises a system for specifying a set of elements associated with the plurality of development projects, wherein corresponding members of the set of elements are associated with corresponding development projects within the plurality of development projects, and wherein the network portal allows a user, using the single user account, to access any of the corresponding members of the set of elements and any of the corresponding development projects;

computer usable program code stored on the recordable-type storage medium for receiving a request to access, via the network portal and using the namespace, a first element within the set of elements;

computer usable program code stored on the recordable-type storage medium for retrieving the first element; and computer usable program code stored on the recordable-type storage medium for taking an action with respect to the first element, wherein the action comprises at least one of naming a software bug, tracking the software bug, specifying a dependency of the software bug on a second software bug, specifying a dependency of the software bug on implementation of a software feature, specifying a dependency of the software feature on a second software feature, specifying a uniform resource link usable to access information about the software bug, mark a duplicate bug, flag a bug, specify that a software feature has been completed, specify a status of a software feature, specify that a software feature has been delayed, specify that a software feature has been canceled, specifying a source of a software feature, and combinations thereof.

11. The recordable-type medium of claim 10, wherein the namespace further comprises a system for specifying a set of services associated with the plurality of development projects, wherein corresponding members of the set of services are associated with the corresponding development projects, wherein corresponding members of the set of elements are further associated with the corresponding members of the set of services, and wherein the network portal allows the user, using the single user account, to access any of the members of the corresponding set of services.

12. The recordable-type medium of claim 11, further comprising:

computer usable program code stored on the recordable-type storage medium for receiving a request to access, via the network portal and using the namespace, a first service within the set of services, wherein the first element is associated with the first service; and computer usable program code stored on the recordable-type storage medium for using the first service.

13. The recordable-type medium of claim 10, wherein the namespace further comprises a system of abbreviation comprising a first alphanumeric string indicating a name, a colon, and a second alphanumeric string appearing after the colon, wherein the second alphanumeric string indicates a unique identification associated with the name.

14. A data processing system comprising:
one or more processors, one or more computer readable storage devices, and one or more computer readable memories;
computer program instructions stored on at least one computer readable storage device for execution by at least one processor via at least one computer readable memory to receive a first request to access a network portal using a single user account, wherein the network portal defines a namespace, wherein the namespace comprises a system for specifying a set of elements associated with the plurality of development projects, wherein corresponding members of the set of elements are associated with corresponding development projects within the plurality of development projects, and wherein the network portal allows a user, using the single user account, to access any of the corresponding members of the set of elements and any of the corresponding development projects;
computer program instructions stored on at least one computer readable storage device for execution by at least one processor via at least one computer readable memory to receive a second request to access, via the network portal and using the namespace, a first element within the set of elements;
computer program instructions stored on at least one computer readable storage device for execution by at least one processor via at least one computer readable memory to retrieve the first element; and
computer program instructions stored on at least one computer readable storage device for execution by at least one processor via at least one computer readable memory to take an action with respect to the first element, wherein the action comprises at least one of naming a software bug, tracking the software bug, specifying a dependency of the software bug on a second software bug, specifying a dependency of the software bug on implementation of a software feature, specifying a dependency of the software feature on a second software feature, specifying a uniform resource link usable to access information about the software bug, mark a duplicate bug, flag a bug, specify that a software feature has been completed, specify a status of a software feature, specify that a software feature has been delayed, specify that a software feature has been canceled, specifying a source of a software feature, and combinations thereof.

15. The data processing system of claim 14, wherein the namespace further comprises a system for specifying a set of services associated with the plurality of development projects, wherein corresponding members of the set of services are associated with the corresponding development projects, wherein corresponding members of the set of elements are further associated with the corresponding members of the set of services, and wherein the network portal allows the user, using the single user account, to access any of the members of the corresponding set of services.

16. The data processing system of claim 15, further comprising:
computer program instructions stored on at least one computer readable storage device for execution by at least one processor via at least one computer readable memory to receive a third request to access, via the network portal and using the namespace, a first service within the set of services, wherein the first element is associated with the first service; and
computer program instructions stored on at least one computer readable storage device for execution by at least one processor via at least one computer readable memory to use the first service.

17. The data processing system of claim 14, wherein the namespace further comprises a system of abbreviation comprising a first alphanumeric string indicating a name, a colon, and a second alphanumeric string appearing after the colon, wherein the second alphanumeric string indicates a unique identification associated with the name.

* * * * *